(12) United States Patent
Rabiei et al.

(10) Patent No.: US 12,547,048 B1
(45) Date of Patent: *Feb. 10, 2026

(54) ELECTRO-OPTIC THZ EMITTER AND RECEIVER DEVICES AND METHOD OF FABRICATION

(71) Applicant: Partow Technologies LLC, Vista, CA (US)

(72) Inventors: Payam Rabiei, Vista, CA (US); Seyfollah Toroghi, Vista, CA (US)

(73) Assignee: Partow Technologies, LLC., Vista, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 18/243,776

(22) Filed: Sep. 8, 2023

Related U.S. Application Data

(63) Continuation-in-part of application No. 17/013,614, filed on Sep. 6, 2020, now Pat. No. 11,815,747.

(60) Provisional application No. 62/897,253, filed on Sep. 6, 2019.

(51) Int. Cl.
| | | |
|---|---|---|
| *G02F 1/35* | (2006.01) | |
| *G02F 1/035* | (2006.01) | |
| *G02F 1/21* | (2006.01) | |
| *G02F 1/225* | (2006.01) | |

(52) U.S. Cl.
CPC ............ *G02F 1/3544* (2013.01); *G02F 1/035* (2013.01); *G02F 1/212* (2021.01); *G02F 1/2252* (2013.01)

(58) Field of Classification Search
None
See application file for complete search history.

(56) References Cited

U.S. PATENT DOCUMENTS 5,069,517 A * 12/1991 Kersten ................... G02F 1/065
385/16

* cited by examiner

*Primary Examiner* — Roberts P Culbert
(74) *Attorney, Agent, or Firm* — Invent Capture, LLC.; Samuel S. Cho (57) ABSTRACT

A novel method for producing a novel electro-optic Terahertz (THz) emission and detection device is disclosed. The resulting end product from this production method is a unique electro-optic THz emission and detection device that includes thin film optical waveguides made from an electro-optic material on a low dielectric constant substrate. An optical circuit fabricated utilizing this production method may be a straight waveguide, a Mach-Zehnder interferometer, a periodically-poled straight waveguide, or a periodically-poled Mach-Zehnder device. The low dielectric constant substrate allows the THz signal velocity to match the optical signal velocity. For a straight waveguide and a Mach-Zehnder modulator sensor structure, phase matching is achieved between a radio-frequency (RF)/THz signal and an optical signal by utilizing a waveguide geometry design or a periodic poling structure, which enables an ultra-high-speed device for generation and detection of Terahertz (THz) e-fields.

10 Claims, 9 Drawing Sheets

ELECTRO-OPTIC THZ EMITTER AND RECEIVER DEVICES AND METHOD OF FABRICATION

INCORPORATION BY REFERENCE

The present invention is a continuation-in-part application of U.S. Ser. No. 17/013,614, which was filed on Sep. 6, 2020. The present invention also incorporates U.S. Ser. No. 17/013,614 by reference. Furthermore, the present invention also incorporates U.S. Ser. No. 16/258,546 and U.S. Pat. No. 9,746,743 by reference. Importantly, all of these incorporated references have at least one common co-inventor to the present invention.

FIELD OF THE INVENTION

The present invention generally relates to a method for producing compact electro-optical terahertz (THz) transmitters and receivers. The present invention also relates to electro-optical electric-field sensors that are based on thin film lithium niobate or lithium tantalite waveguides. The present invention also relates to periodically-poled electro-optic devices for generation and detection of THz signals. Preferably, the electro-optic devices are made on quartz or other low dielectric constant substrate materials. In addition, the present invention relates to electric-field sensors using Mach-Zehnder optical waveguide structures.

BACKGROUND OF THE INVENTION

Terahertz (THz) systems are systems that employ electromagnetic field in the range of 100 GHz to 10 THz for a variety of applications. These applications include THz spectroscopy for detection of various molecules, and fabrication and test of semiconductor devices. THz systems are also utilized in biomedical applications for detection of cancer or other diseases, and also used in airport security applications. All these systems require devices that can generate THz waves as well as devices that can detect THz waves. Using electro-optical crystals, it is possible to generate THz signals via optical rectification of femtosecond (fs) laser pulses or by mixing two lasers at different frequencies.

A THz system may include an electro-optic crystal where a femtosecond (fs) laser is shined on the crystal. The crystal generates a THz pulse through optical rectification. The THz beam then passes through the medium where THz absorption occurs. The beam then passes through a second electro-optic crystal where different polarizations of the femtosecond laser are modulated by the THz beam. The polarizations are then mixed and sent to a low-speed optical detector. The generated signals characterize the optical transmission of the THz signal through time domain sampling of the THz signal. Another method is using two lasers with different frequencies and through mixing by difference signal generation in an electro-optic crystal. The generated THz signal passes through the medium to be diagnosed. The THz signal is then mixed in a second electro-optic crystals with one of the two lasers and then the mixed signal is interfered with the other laser, where a low frequency signal is generated that contains the phase and amplitude information for the THz signal.

Conventional sensor structures disclosed in such existing devices and methods have limitations in sensitivity, size, and maximum THz signal frequency. Therefore, it may be desirable to provide a novel method to generate and detect THz signals with a compact system that exhibits high sensitivity and is configured to detect THz signals at very high frequencies (e.g. 5 THz to 10 THz or even higher). In particular, it may be advantageous to devise a spatially-compact and fiber-coupled novel THz generation and detection device, in contrast to conventional free space systems that suffer from high costs and large physical footprints and dimensions.

Furthermore, it may also be desirable to provide THz generation devices that are more efficient and generate higher THz power, or THz detection devices that are more sensitive and can detect low intensity THz pulses. These novel devices, if implemented successfully, can enable THz systems to achieve small device footprints and dimensions for applications that require very compact devices, while also expanding the range of new applications in the THz electromagnetic spectrum.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a novel method for producing a device for generation of THz signals using electro-optic waveguides is disclosed. The electro-optic THz generation device comprises thin film optical waveguides made from an electro-optic material on a low dielectric constant substrate. An optical circuit is fabricated on this waveguide using lithography and etching techniques to form the THz emitter. The optical circuit may be in the form of a Mach-Zehnder interferometer. The low dielectric constant substrate allows phase matching between the THz signal and optical signal, which enables efficient THz signal generation. THz generating device may have a periodically poled structure for phase matching for generation of higher THz frequencies. In another embodiment of the invention, a novel device for detection of THz signals is introduced. The electro-optic THz detection device comprises thin film electro-optic optical waveguides on a low dielectric constant substrate. An optical circuit is fabricated on this waveguide using lithography and etching techniques to form the THz receiver. The optical circuit may be in the form of a Mach-Zehnder interferometer. The low dielectric constant substrate allows phase matching between the received THz signal and optical signal, which enables efficient THz signal detection. THz detection device may have a periodically-poled structure for phase matching at higher THz frequencies.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and/or other symbolic representations that directly or indirectly resemble one or more electro-optic THz emitting or detecting devices, in accordance with various embodiments of the invention. These apparatus and process descriptions and representations are the means used by those experienced or skilled in the art to convey the substance of their work most effectively to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, an optical signal is defined as an electromagnetic signal that carries information and has a wavelength in the range of 0.3 micron to 3 micron (i.e. 100 THz to 1000 THz). A THz signal is defined as an electromagnetic signal that carries information and has a wavelength in the range of 10 micron to 3 mm or a frequency in the range of 0.01 THz to 30 THz.

In one embodiment of the invention, a novel method for making a THz emitter and receiver devices is disclosed. The THz devices use an electro-optic thin film material on a low dielectric constant substrate, where the THz signal is traveling in low dielectric constant substrate and optical signal is traveling in a dielectric waveguide structure, which is formed on the electro-optic thin film. In this embodiment, two types of devices are disclosed. One type of device is used to generate or emit THz signals when an optical pump is injected into the input port of the device and a second type of device detects a THz signal, where an optical signal, which is injected into on port of the device, is modulated or "mixed" by the impinging THz signal and generates a low frequency optical signal containing information about the THz signal.

The key enabling technology for these emitter and receiver devices is a thin film layer of electro-optic material such as lithium niobate, which is bonded to a low dielectric constant substrate such as quartz crystal. Because an optical signal is contained in the thin film region while the THz signal is traveling in the substrate region, it is possible to approximately phase match (or match the momentum) of the THz signal and optical signal. This allows strong interaction to happen between the two waves (i.e. THz wave and optical wave) and hence energy is transferred between these signals. Therefore, it becomes technically feasible to generate or detect THz signals by employing optical signals.

Figure 7:
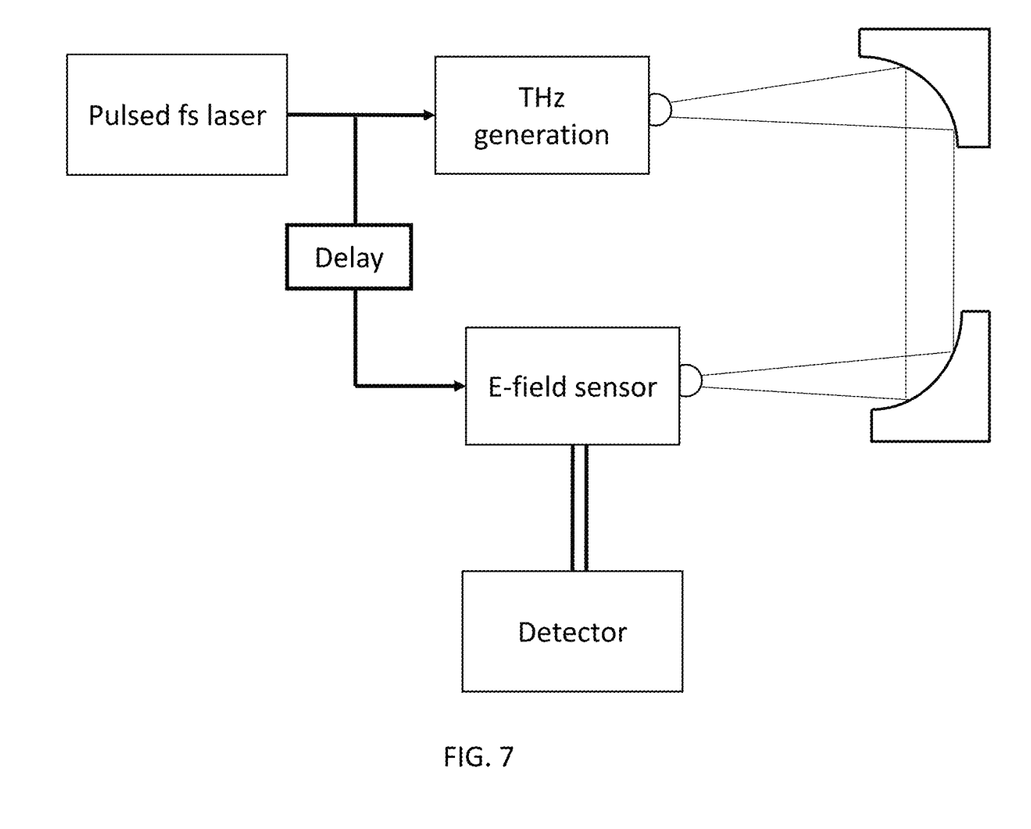
FIG. 7 shows an application example of a novel electric field sensor for sensing of THz signals in a time-domain THz spectroscopy system using femtosecond (fs) pulsed laser sources, in accordance with an embodiment of the invention.
Figure 8:
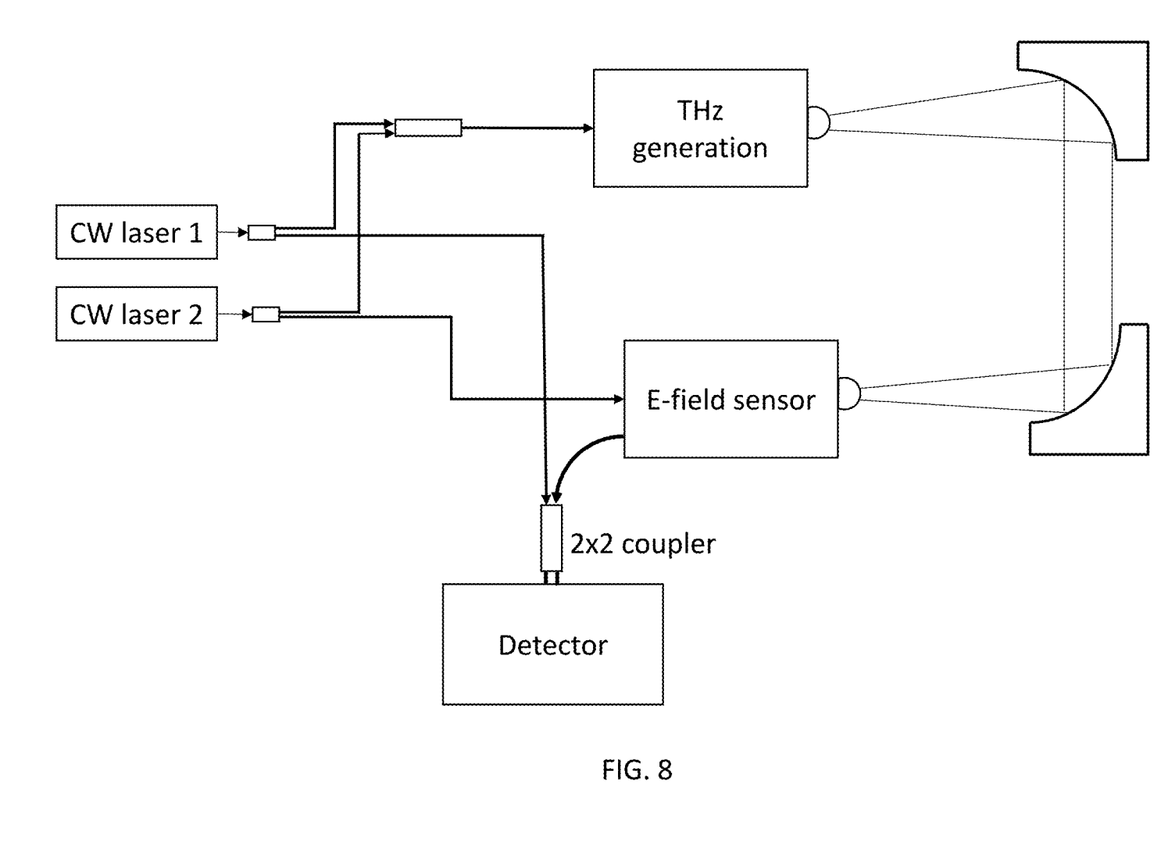
FIG. 8 shows an application example of a novel frequency domain THz spectroscopy system using two lasers with different wavelengths, in accordance with an embodiment of the invention.

Two methods are generally used and known to a skilled person in the art for systems that operate in THz regime. A first method is a time-domain method and is called "time-domain THz spectroscopy," which is illustrated in FIG. 7. A second method is frequency domain-based and is called "frequency-domain THz spectroscopy," which is illustrated in FIG. 8. The emitter and receiver devices disclosed in this invention can be employed in both of these systems.

Figure 1A:
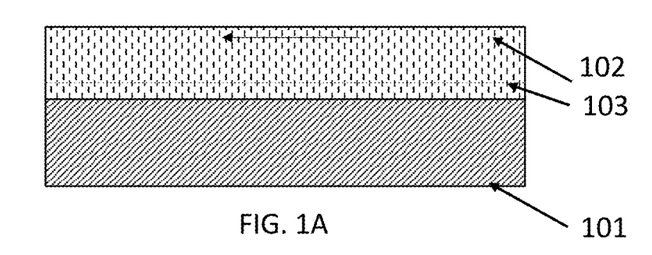
FIGS. 1A~1F show fabrication procedure steps for making a novel electro-optic terahertz (THz) emitting or receiving device, wherein the fabrication procedure steps include thin film production, lithography, metallization, poling, and etching to produce the proposed device structure, in accordance with an embodiment of the invention.
Figure 1B:
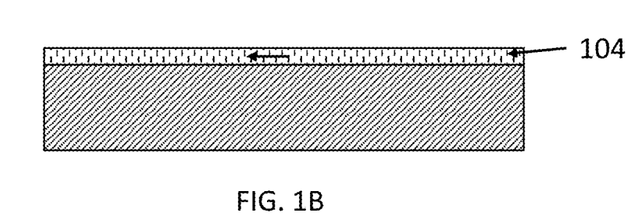
Figure 1C:
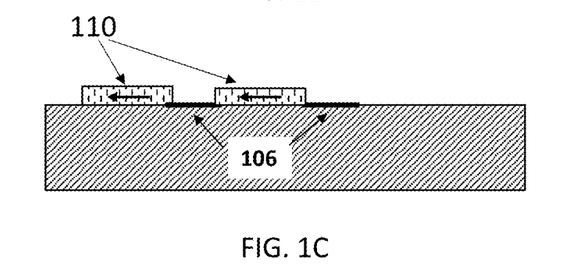

FIGS. 1A-1F show device fabrication steps for producing a THz emitter or received device. As shown in FIG. 1A as a first step, the device is fabricated using an electro-optic material layer (102), which is bonded, transferred, and/or placed on a low dielectric constant substrate (101). In the preferred embodiment of the invention, the fabrication may start with an ion implantation (103) on top of an electro-optic crystal, or another method to form a thin film (104) of the electro-optic material layer (102), as shown in FIGS. 1A-1B. This step is followed by a wafer bonding of the electro-optic material layer (102) (e.g. lithium niobate) on the low dielectric constant substrate (101) (e.g. quartz). Subsequently, as shown in FIG. 1B, the thin film (104) of the electro-optic material is formed on the low dielectric constant substrate (101). In the next step as shown in FIG. 1C, if a poling process is needed for the end product from these manufacturing steps, the thin film electro-optic layer is lithographically patterned and etched to form mesa structures (110). Electrodes (106) are then deposited and patterned on the thin film (104) of the electro-optic material, which enables alternations of the ferroelectric domains, as further described below.

Figure 1D:
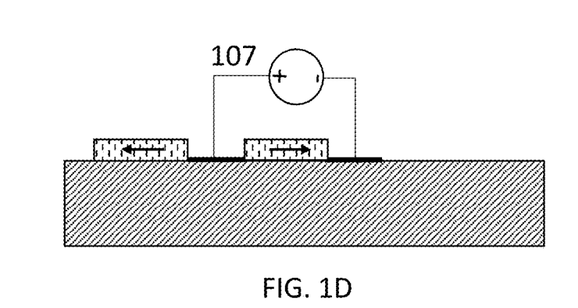
Figure 1E:
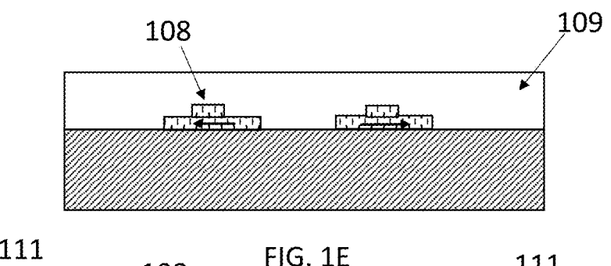
Figure 1F:
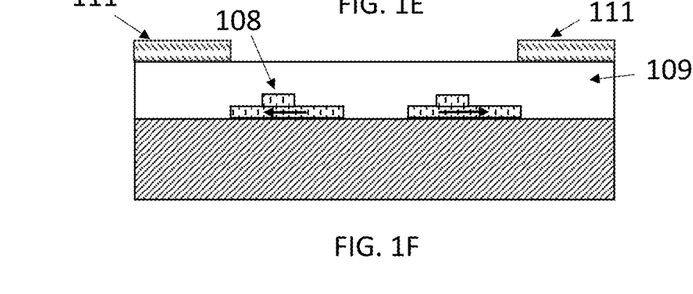

Subsequently, as shown in FIG. 1D, a high voltage source (107) is used to reverse the ferroelectric domain of selected mesa. Then, the electrodes (106) are removed by etching to achieve a structure with no metallic parts. Subsequently, as shown in FIG. 1E, a lithography and etching process is used to define the ridge optical waveguide structure (108), and a final top cladding layer (109) is deposited, which enables the device to be coupled to optical fibers using the grating coupler sections. A final optional step, as shown in FIG. 1F, is deposition of a metal (111), such as gold, on top of the cladding layer (109). The deposited metal (111) acts as an antenna and can be used to enhance the THz generation or detection efficiency of emitters or receivers. The processing steps as shown and described in association with FIG. 1A~1F are device fabrication steps to produce the sensor device, in accordance with an embodiment of the invention.

Figure 2A:
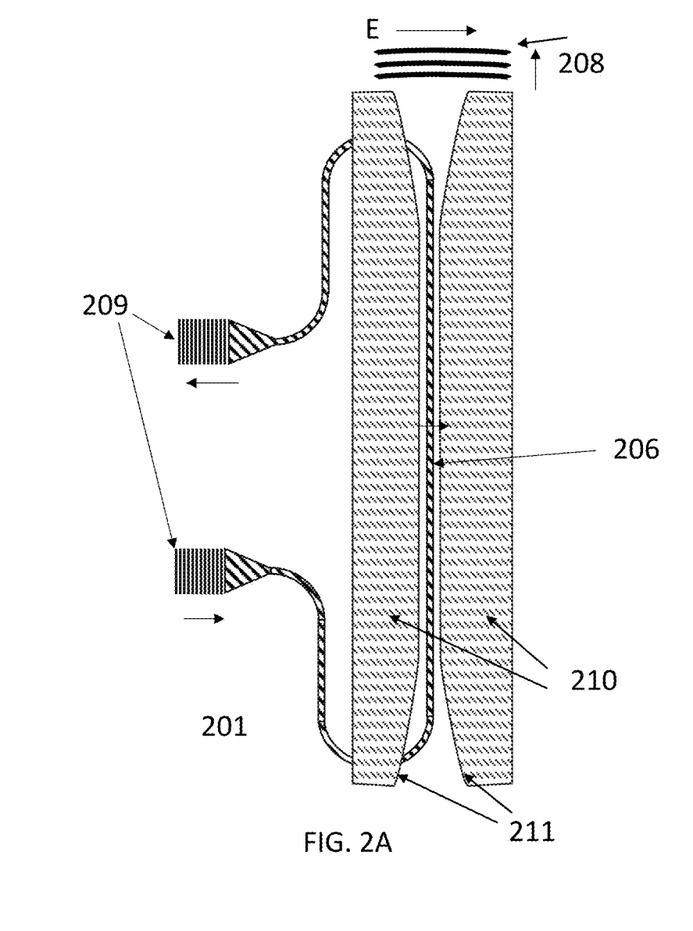
FIG. 2A shows an optical circuit of a THz emitter device based on optical waveguides and grating coupler sections while showing the direction of the spontaneous polarization of the electro-optic material and an optional THz antenna, in accordance with an embodiment of the invention.
Figure 2B:
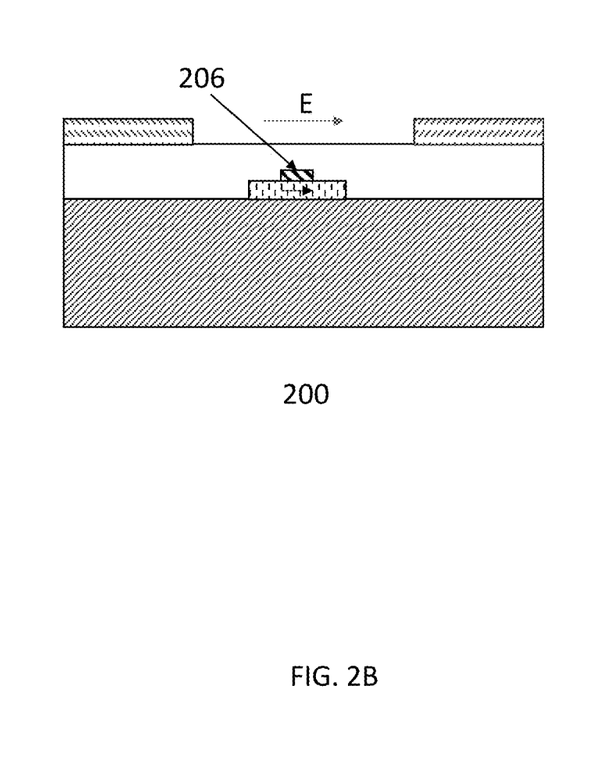
FIG. 2B shows a cross section of the optical circuit illustrated in FIG. 2A, in accordance with an embodiment of the invention.
Figure 6A:
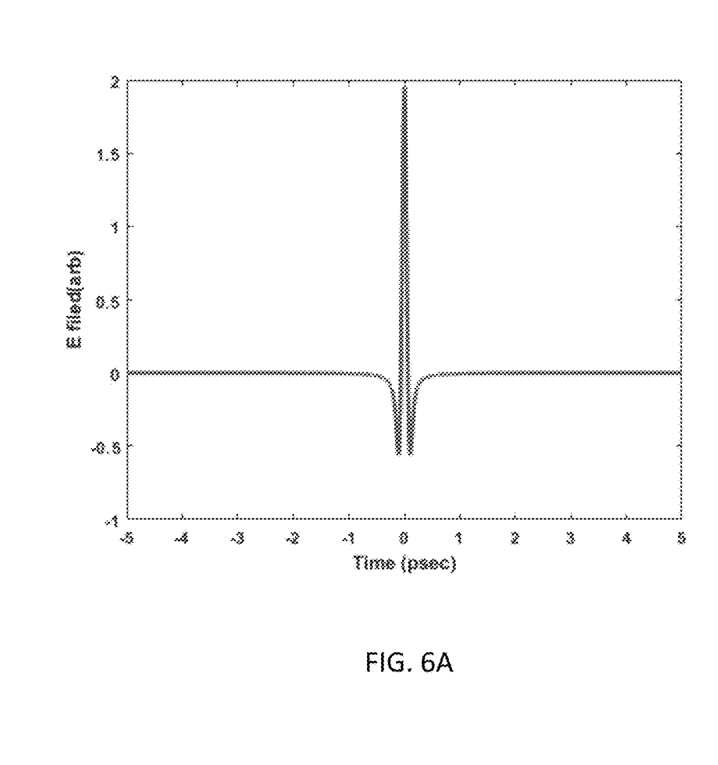
FIG. 6A shows a time domain THz signal generated by a perfectly phase-matched device with no periodic poling.

FIG. 2A shows a photonic circuit device (201), and FIG. 2B shows the cross section (200) of this photonic circuit to make THz emitter device, which utilizes the device fabrication process steps described previously, in accordance with an embodiment of the invention. This photonic circuit device (201) is a straight optical waveguide (206), which is coupled to an optical light source using grating couplers (209) or some other method of coupling. If an ultrashort pulse of light is injected to the device, the device produces a THz pulse (208), which is emitted in a collinear direction with the direction of light propagation in the straight optical waveguide (206). This is achieved through a process called "optical rectification." In optical rectification process, the velocity of the optical signal and THz signal must be equal. This condition is called "phase matching" condition. The disclosed device achieves the phase matching by confining the light in the optical waveguide and confining the THz wave in the low dielectric constant substrate. An antenna structure (210) may be used to further confine the THz signal close to the optical waveguide and thereby enhance the conversion efficiency and interaction between THz wave and optical wave. After the THz signal is generated in the narrow section of antenna (210), a taper (211) is used to transform the THz signal to a larger mode size that can be coupled to the external environment with limited diffraction. This antenna structure is well known for a person skilled in the art. Typical waveguide width dimensions is 1 micron, and the length can be as short as 100 microns to 10 mm long. The narrow gap of antenna structure can be as low as 5 microns or as large as 100 microns. The electro-optic thin film can be lithium niobate, lithium tantalate or similar materials. The low index substrate can be glass, crystalline or amorphous quartz. This device embodies a simple structure for convenient utilization in THz signal generation. It does not need any poling process. However, as elaborated in descriptions in conjunction with other figures, in order to achieve a THz source at a high THz frequency range, a periodic poling process may be needed in some instances. As a case in point, a typical time domain THz signal shape that can be created by using this device and a femtosecond (fs) laser is shown in FIG. 6A.

Figure 3A:
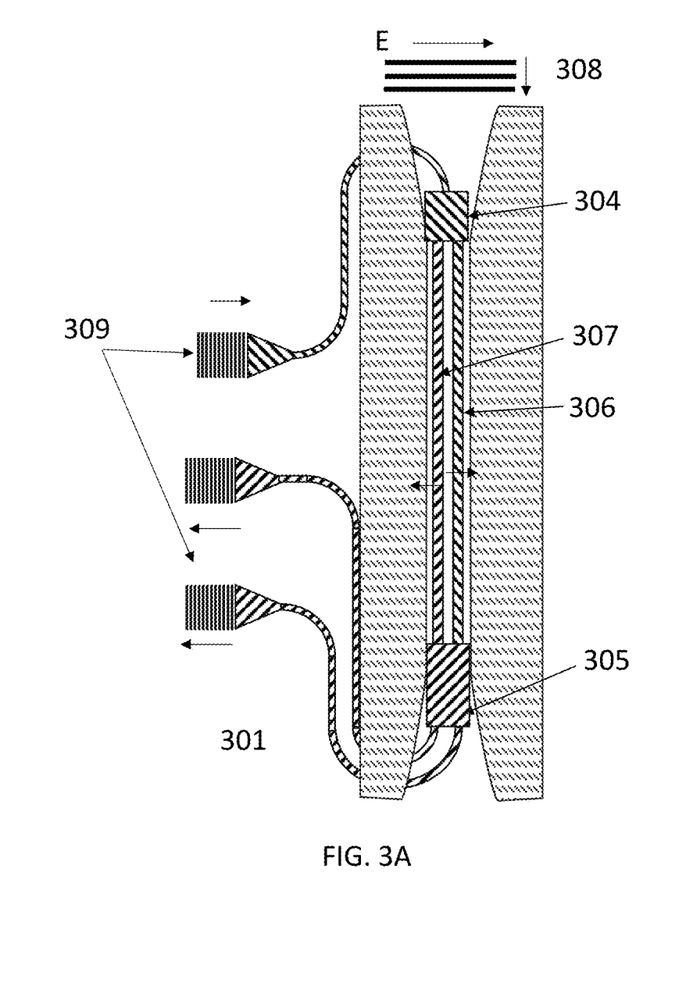
FIG. 3A shows an optical circuit of a Mach-Zehnder based electric-field sensor incorporating optical waveguides, grating coupler sections, and a THz antenna and two arms of the interferometer and the opposing direction of spontaneous polarization of the electro-optic material, in accordance with an embodiment of the invention.

FIG. 3A shows a device structure (301) for detection of THz signals in accordance with an embodiment of this invention. This device structure (301) represents a Mach-Zehnder modulator structure where two arms (306, 307) of the device are poled in opposite directions. The light is coupled into the device using an optical grating coupler (309) and is split between two arms using a 1×2 MMI device (304). When an electric field of a THz signal (308) impinges to the device (301), the refractive index of the first arm (i.e. 306) increases while the refractive index of the second arm (i.e. 307) decreases. This creates a phase difference for the light between the two arms (306, 307) of the device (301), which in turn results in destructive or constructive interference after they are combined using a multimode interference (MMI) combiner (305). Therefore, in this embodiment, the optical signal is modulated using the alternating electric field of THz signal, which can be detected using a low frequency optical signal detector to obtain information on the THz signal. In this photonic circuit device (301), the light is coupled into and out of the device using one or more optical grating couplers (309). The grating couplers transform the optical mode from an optical fiber to the small mode of the waveguide of the device. The fibers are configured to be placed using a v-groove fiber array in proximity of the grating coupler sections and can be attached to the device using optical adhesives. The input coupler section can also be in other forms, such as an inverse taper known to a person skilled in the art.

Figure 3B:
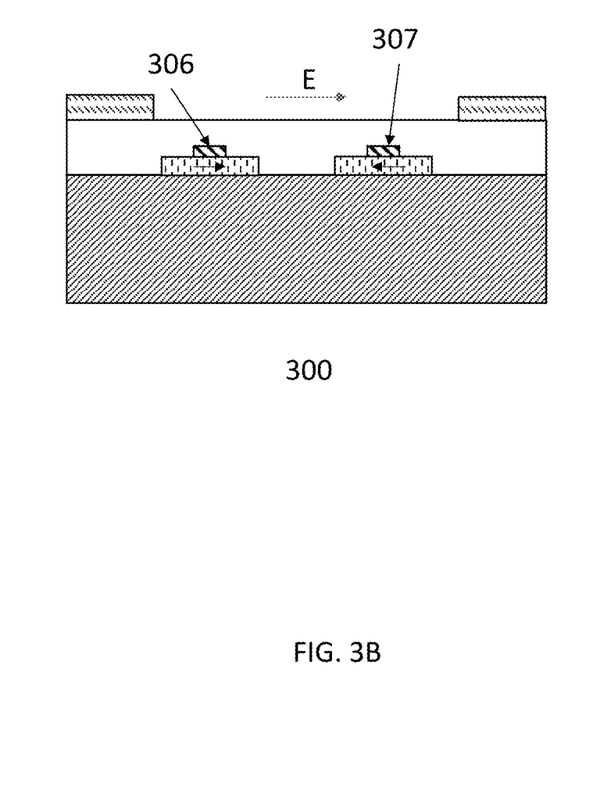
FIG. 3B shows a cross section of the optical circuit illustrated in FIG. 3A, in accordance with an embodiment of the invention.

FIG. 3B shows a cross section (300) of the optical circuit illustrated in FIG. 3A, in accordance with an embodiment of the invention. The cross section (300) shows a Mach-Zehnder modulator structure where two arms (306, 307) of the device are poled in opposite directions. When an electric field (E) of a THz signal impinges to the device, the refractive index of the first arm (i.e. 306) increases while the refractive index of the second arm (i.e. 307) decreases. This creates a phase difference for the light between the two arms (306, 307) of the device which are subsequently interfered using MMI device to produce intensity modulated signals.

The novel THz generation and detection devices from an embodiment of the present invention may operate at a wavelength of 1550 nm, or at other optical wavelengths. In the preferred embodiment of the invention, the width of waveguide structures can be between 200 nm to 2 microns, and the thickness of waveguide structures may be 100 nm to 1 micron, depending on the operational wavelength. Furthermore, in the preferred embodiment, the length of the arms of Mach-Zehnder waveguide structure may be 100 microns to several millimeters, depending on the applications. The grating coupler sections may be a focusing type or a non-focusing type. Additional type of coupling structures, such as tapered edge couplers, may be utilized. This detection device may be used with ultrafast femtosecond (fs) laser sources to become a THz time-domain spectrometer or with CW lasers to become a THz frequency-domain spectrometer.

Figure 4A:
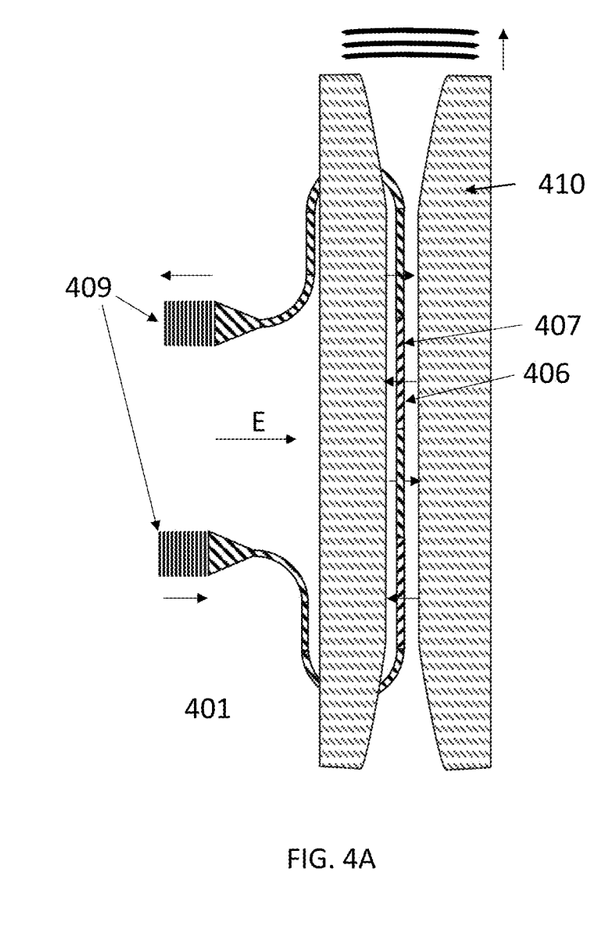
FIG. 4A shows an optical circuit of a THz emitter device based on optical waveguides and grating coupler sections while showing a periodically reversed direction of the spontaneous polarization of the electro-optic material and an optional THz antenna, in accordance with an embodiment of the invention.

FIG. 4A shows an optical circuit of a THz emitter device based on optical waveguides and grating coupler sections while showing a periodically reversed direction of the spontaneous polarization of the electro-optic material and an optional THz antenna, in accordance with an embodiment of the invention. In particular, FIG. 4A shows a device structure (401) for emission of THz signals in accordance with an embodiment of this invention. This device structure (401)

comprises a straight optical waveguide (406), which is coupled to an optical light source using grating couplers (409) or some other method of coupling. If an ultrashort pulse of light is injected to the device, the device produces a THz pulse, which is emitted in a collinear direction with the direction of light propagation in the straight optical waveguide (406). In order to achieve a THz source at a high THz frequency range, a periodic poling process may be desirable in this instance. This device structure (401) incorporates a periodically reversed domain structure (407), as shown in FIG. 4A.

An antenna structure (410) may be used to further confine the THz signal close to the optical waveguide and thereby enhance the conversion efficiency and interaction between THz wave and optical wave. After the THz signal is generated in the narrow section of antenna (410), a taper is used to transform the THz signal to a larger mode size that can be coupled to the external environment with limited diffraction. This antenna structure is well known for a person skilled in the art. Typical waveguide width dimensions is 1 micron, and the length can be as short as 100 microns to 10 mm long. The narrow gap of antenna structure can be as low as 5 microns to 100 microns. The electro-optic thin film can be lithium niobate, lithium tantalate or similar materials. The low index substrate can be glass, crystalline or amorphous quartz.

Figure 4B:
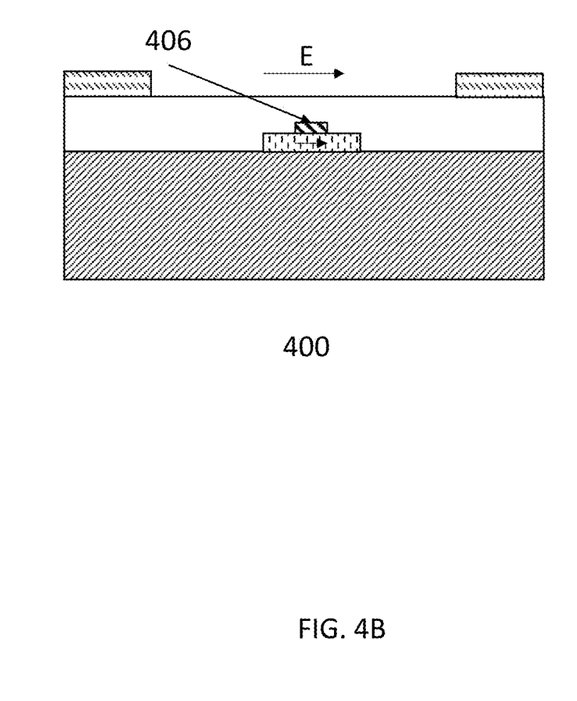
FIG. 4B shows a cross section of the optical circuit illustrated in FIG. 4A, in accordance with an embodiment of the invention.
Figure 6B:
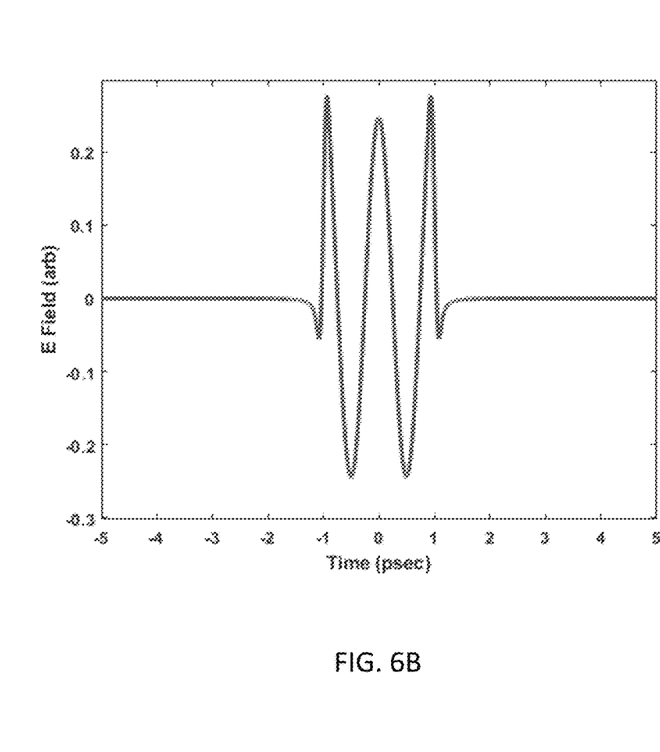
FIG. 6B shows a time domain THz signal for a periodically poled device, in accordance with an embodiment of this invention.

FIG. 4B shows a cross section (400) of the optical circuit illustrated in FIG. 4A, in accordance with an embodiment of the invention. The straight optical waveguide (406) is periodically poled to phase match the THz signal with the optical signal. For higher THz frequency emission in the range of 1 THz to 20 THz, it might not be feasible to match the THz signal and optical signal propagation velocity in a simple waveguide geometry. A periodic array of poled domains can be used for this purpose. The device is very similar to the device shown in FIG. 2A except for the introduction of the periodically reversed domain structure (407). The periodic poling section period can be obtained using this formula:

$$\Lambda = \lambda/(n_o - n_{TH})$$

Where $\lambda$ is the THz wavelength and $n_o - n_{TH}$ is the difference between the group index of optical signal and the THz signal. For example, for a frequency of 6 THz, the THz wavelength is 50 microns. Typically, the $n_o$ is equal to 2.4 for lithium niobate waveguide and the $n_{TH}$ is equal to 2.2 for a quartz substrate. Hence the required poling period will be equal to 250 microns. FIG. 6B shows a typical signal that is generated using periodically poled emitting device.

Figure 5A:
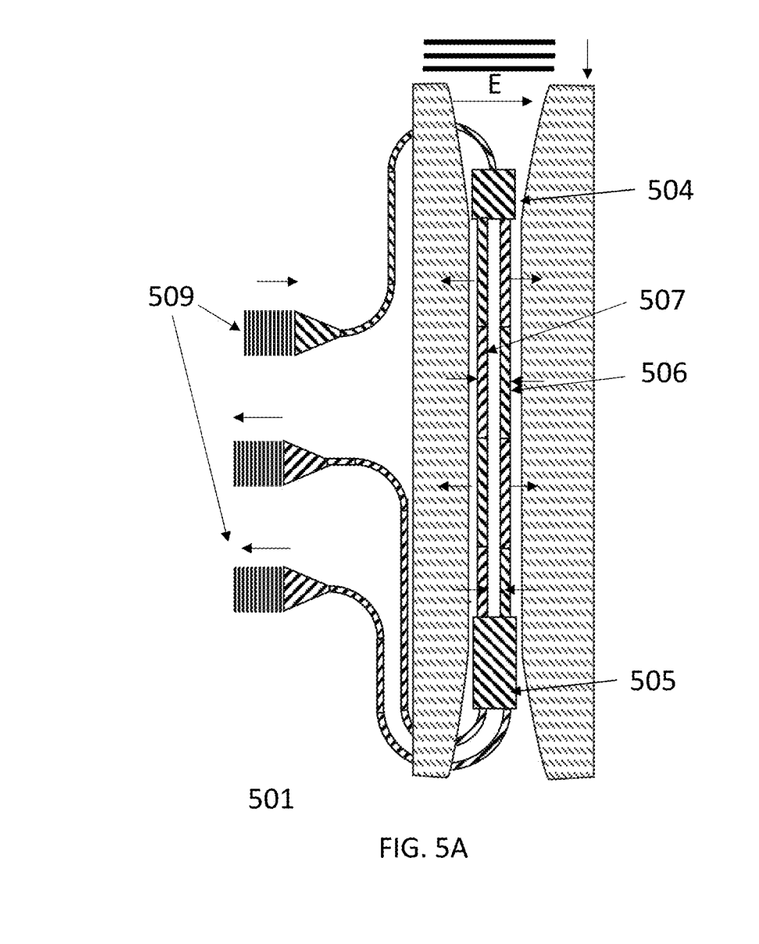
FIG. 5A shows an optical circuit of a Mach-Zehnder based electric-field sensor incorporating optical waveguides, grating coupler sections, and an optional THz antenna and two arms of the interferometer, while also showing a periodically reversed direction of the spontaneous polarization of the electro-optic material, in accordance with an embodiment of the invention.

FIG. 5A shows an optical circuit of a Mach-Zehnder based electric-field sensor incorporating optical waveguides, grating coupler sections, and an optional THz antenna and two arms of the interferometer, while also showing a periodically reversed direction of the spontaneous polarization of the electro-optic material, in accordance with an embodiment of the invention. In particular, FIG. 5A illustrates a device structure (501) for detection of THz signals in accordance with an embodiment of this invention. This device structure (501) represents a Mach-Zehnder modulator structure where two arms (506, 507) of the device are poled periodically and in opposite directions. The light is coupled into the device using an optical grating coupler (509) and is split between two arms using a 1×2 MMI device (504). When an electric field of a THz signal impinges to the device, it interacts with the optical signal in the waveguide and modulates the phase of optical signal. The Thz and optical signal travel at different speeds. The periodically poling section phase matches these signals. A similar phase modulated signal with an opposite phase is created in the second arm. The two phase-modulated signals in two waveguides (506, 507) of the device, are combined in the output MMI (505) which due to destructive or constructive interference creates an intensity modulated signal. Therefore, in this embodiment, the optical signal is modulated using the alternating electric field of THz signal, which can be detected using a low frequency optical signal detector to obtain information on the THz signal. In this photonic circuit device structure (501), the light is coupled into and out of the device using one or more optical grating couplers (509). The grating couplers transform the optical mode from an optical fiber to the small mode of the waveguide of the device. The fibers are configured to be placed using a v-groove fiber array in proximity of the grating coupler sections and can be attached to the device using optical adhesives. The input coupler section can also be in other forms, such as an inverse taper known to a person skilled in the art.

The photonic circuit device structure (501), as embodied in FIG. 5A, is very similar to the device shown in FIG. 3A for detection of THz signals, except for the introduction of periodic array of reversed domains in two arms (i.e. 506, 507) of the Mach-Zehnder interferometer. Similar to the emission device, in the detection device, it may not be possible to phase-match the THz signal and optical signal at higher frequencies. Between the two arms (i.e. 506, 507), an opposite and periodically-poled structure can overcome this limitation by achieving phase matching between a THz signal and an optical signal. This detecting device can be utilized with a periodically-poled emitting device in a THz system that operates at higher end of the THz spectrum.

Figure 5B:
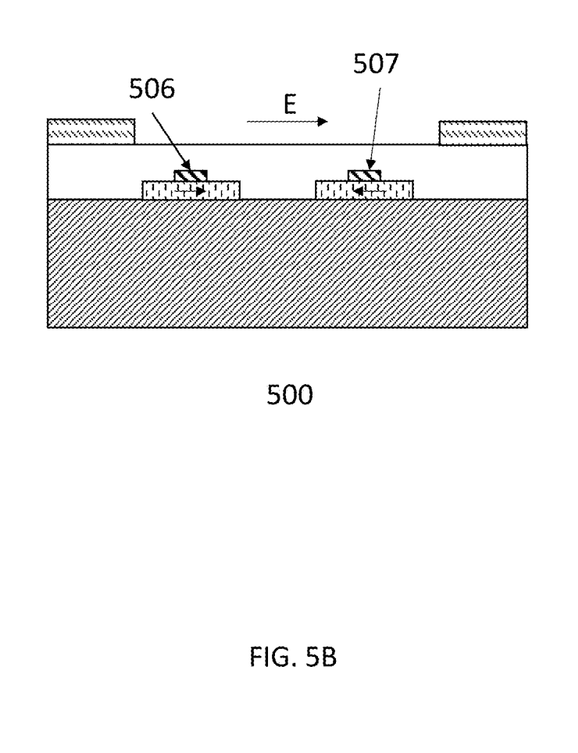
FIG. 5B shows a cross section of the optical circuit illustrated in FIG. 5A, in accordance with an embodiment of the invention.

FIG. 5B shows a cross section (500) of the optical circuit illustrated in FIG. 5A, in accordance with an embodiment of the invention. The cross section (500) shows a Mach-Zehnder modulator structure where two arms (506, 507) of the device are poled in opposite directions. When an electric field (E) of a THz signal impinges to the device, the refractive index of the first arm (i.e. 506) increases while the refractive index of the second arm (i.e. 507) decreases. This creates a phase difference for the light between the two arms (506, 507) of the device. The periodically domain inversion that follows ensures the THz signal, amplifies the phase modulation as it propagates through the device.

FIG. 6A shows a THz signal generated for a perfectly phase-matched device with no periodic poling, in accordance with an embodiment of the invention. Furthermore, FIG. 6B shows a THz signal generated using a periodically-poled device, in accordance with an embodiment of this invention.

FIG. 7 shows an application example of a novel electric field sensor for sensing of THz signals in an electric field in a time-domain THz spectroscopy system using femtosecond (fs) pulsed laser sources, in accordance with an embodiment of the invention.

FIG. 8 shows an application example of a novel electric field sensor for sensing of continuous-wave (CW) THz signals electric field in a frequency-domain THz spectroscopy system, in accordance with an embodiment of the invention.

Figure 9:
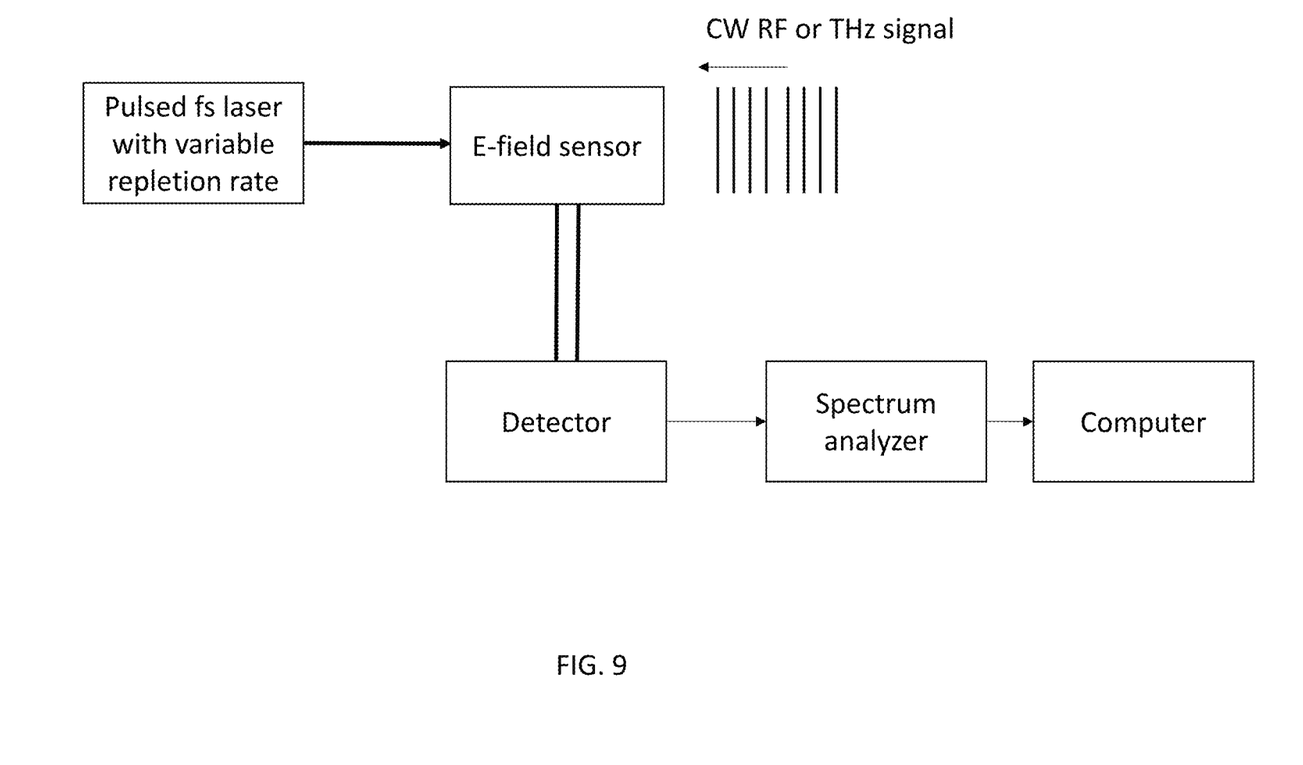
FIG. 9 shows an applications example of a novel Mach-Zehnder electric field sensor for detection of RF signals or THz signals, in accordance with an embodiment of the invention.

FIG. 9 shows an application example of a novel THz electric field detector based on the Mach-Zehnder type sensors in accordance with an embodiment of the invention. In the conventional state of the art, it is necessary to have extremely fast electronic circuits to detect THz signals at very high frequencies, which are cost prohibitive and/or inefficient. Instead, it may be more advantageous to detect these high frequency signals by utilizing a novel system implemented in accordance with an embodiment of the invention, as shown in FIG. 9. This system uses a femto-second (fs) laser and a simple Mach-Zehnder sensor or a periodically-poled Mach-Zehnder sensor, as described in conjunction with other figures in the present invention. The femto-second lasers sample the THz signal in time domain. In theory, a sampling rate higher than two times the highest frequency of the signal (i.e. Nyquist rate) is required to reconstruct an RF signal completely. However, for many applications, the THz spectrum is sparse and sub-Nyquist rate sampling works to obtain information about the signals. A femto-second laser with a repletion rate of 50 MHz to 10 GHz can be utilized to sample THz signals as high as 10 THz due to the sparsity of the signals. The signals should have a limited bandwidth (e.g. 50 MHz-10 GHz) depending on the repetition rate of femto-second laser. A variable repetition rate for femto-second laser may be required to obtain information on all frequencies of THz signals. Algorithms such as compressive sensing can be utilized to reconstruct a complete signal in this instance.

Various embodiments of the present invention introduce one or more novel methods to produce an electro-optic THz emission and detection devices for generating or detecting THz signals. In one embodiment of the invention, an optical waveguide device is produced on a thin film of lithium niobate bonded on a quartz substrate. By injecting a pulsed optical signal or by mixing two lasers with different frequencies and injecting into the device, a THz signal is generated. By using a device with two arms in a Mach-Zehnder interferometric geometry and by poling the arms in opposite directions it is possible to achieve a THz detection device. Opposing optical signal phases in two arms modulated by THz signals interfere and creates an optical intensity signal that can be detected using a detector. Other detection methods such as optical spectrum analyzer or frequency resolved optical gating (FROG) method can also be used for detection. Periodically poled emitting and detecting devices can be used for generation and detection of THz signals at a higher THz frequency range.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims presented below.

What is claimed is:

1. A method for producing an electro-optic terahertz (THz) emitting or receiving device, compromising the steps of:
   placing and bonding an electro-optic material layer on top of a low dielectric constant substrate;
   forming a thin film of the electro-optic material layer on top of the low dielectric constant substrate;
   depositing and patterning metallic electrode layers on the thin film of the electro-optic material layer and the low dielectric constant substrate to accommodate poling that alternates ferroelectric domains of the electro-optic THz emitting or receiving device whenever necessary;
   poling to reverse a direction of spontaneous polarization of the thin film of the electro-optic material layer in selected regions, wherever reversing the direction of spontaneous polarization in the selected regions is desired;
   removing the metallic electrode layers to achieve a resulting structure with no metallic parts;
   utilizing lithography and etching to define a ridge waveguide structure;
   encapsulating the ridge waveguide structure in a top cladding layer; and
   aligning and attaching fiber optic cables to the ridge waveguide structure to constitute the electro-optic THz emitting or receiving device.

2. The method of claim 1, further comprising a step of performing an ion implantation on top of an electro-optic crystal prior to the step of placing and bonding the electro-optic material layer on top of the low dielectric constant substrate in order to use crystal ion slicing method for production of thin film electro-optic layer.

3. The method of claim 1, wherein the electro-optic material layer is made of lithium niobate or lithium tantalate, and the low dielectric constant substrate is made of glass, crystalline, or amorphous quartz.

4. The method of claim 1, wherein the ridge waveguide structure is used for emitting a THz signal with an optional metallic layer that act as an antenna.

5. The method of claim 1, wherein the ridge waveguide structure is a Mach-Zehnder modulator with a first arm poled opposite to a second arm, and wherein the Mach-Zehnder modulator is used for detection of THz signal by creating an intensity modulated signal proportional to THz electric field value with an optional metallic layer that acts as an antenna.

6. The method of claim 1, wherein the ridge waveguide structure is poled periodically to phase match optical signal and THz signals at higher THz frequencies and is used for emission of THz signal with an optional metallic layer that act as an antenna.

7. The method of claim 1, wherein the ridge waveguide structure is a Mach-Zehnder modulator with opposite polarity periodically poled arms, and wherein the Mach-Zehnder modulator is used for detection of THz signals at higher frequencies by creating an intensity-modulated optical signal proportional to THz electric field value with an optional metallic layer that acts as an antenna.

8. The method of claim 1, wherein the electro-optic THz emitting or receiving device is part of a time-domain THz spectroscopy system in which a THz signal is generated by a femtosecond laser and detected by the electro-optic THz emitting or receiving device.

9. The method of claim 1, wherein the electro-optic THz emitting or receiving device is part of a frequency-domain THZ spectroscopy system in which a THZ signal is generated with two CW laser sources and detected by the electro-optic THz emitting or receiving device.

10. The method of claim 1, wherein the electro-optic THz emitting or receiving device is part of an RF or THz detector device, wherein a femto-second laser is utilized to sample an RF or THz signal in time domain using a sub-Nyquist sampling rate.

* * * * *